US008793131B2

(12) United States Patent
Guerra et al.

(10) Patent No.: US 8,793,131 B2
(45) Date of Patent: Jul. 29, 2014

(54) SYSTEMS, METHODS, AND MEDIA FOR DETERMINING FRAUD PATTERNS AND CREATING FRAUD BEHAVIORAL MODELS

(75) Inventors: Lisa Guerra, Los Altos, CA (US); Richard Gutierrez, San Jose, CA (US); David Hartig, Oakland, CA (US); Anthony Rajakumar, Fremont, CA (US); Vipul Vyas, Palo Alto, CA (US)

(73) Assignee: Verint Americas Inc., Alpharetta, GA (US)

( * ) Notice: Subject to any disclaimer, the term of this patent is extended or adjusted under 35 U.S.C. 154(b) by 376 days.

(21) Appl. No.: 13/290,011

(22) Filed: Nov. 4, 2011

(65) Prior Publication Data

US 2012/0072453 A1 Mar. 22, 2012

Related U.S. Application Data

(63) Continuation-in-part of application No. 11/754,974, filed on May 29, 2007, now Pat. No. 8,073,691, and a continuation-in-part of application No. 11/754,975, (Continued)

(51) Int. Cl.
*G10L 17/00* (2013.01)
*H04M 1/66* (2006.01)
*G06F 21/32* (2013.01)
*H04L 9/32* (2006.01)

(52) U.S. Cl.
CPC . *G06F 21/32* (2013.01); *H04L 9/32* (2013.01)
USPC .......................... 704/246; 704/270; 379/88.02

(58) Field of Classification Search
CPC .................................. G06F 21/32; H04L 9/32
See application file for complete search history.

(56) References Cited

U.S. PATENT DOCUMENTS

| 4,653,097 A | 3/1987 | Watanabe et al. |
| 5,805,674 A | 9/1998 | Anderson, Jr. |

(Continued)

FOREIGN PATENT DOCUMENTS

| EP | 0598469 A2 | 5/1994 |
| JP | 2006038955 | 9/2006 |

(Continued)

OTHER PUBLICATIONS

Office Action, Dec. 13, 2013, U.S. Appl. No. 13/482,841, May 29, 2012.

(Continued)

*Primary Examiner* — Brian Albertalli
(74) *Attorney, Agent, or Firm* — Meunier Carlin & Curfman

(57) ABSTRACT

Systems, methods, and media for analyzing fraud patterns and creating fraud behavioral models are provided herein. In some embodiments, methods for analyzing call data associated with fraudsters may include executing instructions stored in memory to compare the call data to a corpus of fraud data to determine one or more unique fraudsters associated with the call data, associate the call data with one or more unique fraudsters based upon the comparison, generate one or more voiceprints for each of the one or more identified unique fraudsters from the call data, and store the one or more voiceprints in a database.

14 Claims, 14 Drawing Sheets

Related U.S. Application Data filed on May 29, 2007, now abandoned, which is a continuation-in-part of application No. 12/352,530, filed on Jan. 12, 2009, application No. 13/290,011, which is a continuation-in-part of application No. 12/856,200, filed on Aug. 13, 2010, application No. 13/290,011, which is a continuation-in-part of application No. 12/856,118, filed on Aug. 13, 2010, which is a continuation-in-part of application No. 12/856,037, filed on Aug. 13, 2010, now Pat. No. 8,510,215, which is a continuation-in-part of application No. 11/404,342, filed on Apr. 14, 2006, application No. 13/290,011, which is a continuation-in-part of application No. 13/278,067, filed on Oct. 20, 2011, now Pat. No. 8,311,826, which is a continuation of application No. 11/754,974, filed on May 29, 2007, now Pat. No. 8,073,691, which is a continuation-in-part of application No. 11/404,342, filed on Apr. 14, 2006, said application No. 11/754,975 is a continuation-in-part of application No. 11/404,342, filed on Apr. 14, 2006, said application No. 12/352,530 is a continuation-in-part of application No. 11/404,342, filed on Apr. 14, 2006, said application No. 12/856,200 is a continuation-in-part of application No. 11/404,342, filed on Apr. 14, 2006, said application No. 12/856,118 is a continuation-in-part of application No. 11/404,342, filed on Apr. 14, 2006.

(60) Provisional application No. 60/923,195, filed on Apr. 13, 2007, provisional application No. 60/808,892, filed on May 30, 2006, provisional application No. 61/197,848, filed on Oct. 31, 2008, provisional application No. 61/010,701, filed on Jan. 11, 2008, provisional application No. 61/335,677, filed on Jan. 11, 2010, provisional application No. 60/673,472, filed on Apr. 21, 2005.

(56) References Cited

U.S. PATENT DOCUMENTS

| | | | |
|---|---|---|---|
| 5,907,602 A | | 5/1999 | Peel et al. |
| 5,963,908 A * | | 10/1999 | Chadha ............... 704/273 |
| 5,999,525 A | | 12/1999 | Krishnaswamy et al. |
| 6,044,382 A | | 3/2000 | Martino |
| 6,145,083 A | | 11/2000 | Shaffer et al. |
| 6,266,640 B1 | | 7/2001 | Fromm |
| 6,427,137 B2 | | 7/2002 | Petrushin |
| 6,510,415 B1 * | | 1/2003 | Talmor et al. ............... 704/273 |
| 6,587,552 B1 * | | 7/2003 | Zimmermann ........ 379/114.14 |
| 6,597,775 B2 | | 7/2003 | Lawyer et al. |
| 7,039,951 B1 | | 5/2006 | Chaudhari et al. |
| 7,158,622 B2 | | 1/2007 | Lawyer et al. |
| 7,212,613 B2 | | 5/2007 | Kim et al. |
| 7,386,105 B2 | | 6/2008 | Wasserblat |
| 7,539,290 B2 | | 5/2009 | Ortel |
| 7,657,431 B2 | | 2/2010 | Hayakawa |
| 7,668,769 B2 | | 2/2010 | Baker et al. |
| 7,778,832 B2 | 8/2010 | Broman et al. |
| 7,822,605 B2 | 10/2010 | Zigel et al. |
| 7,908,645 B2 | 3/2011 | Varghese et al. |
| 7,940,897 B2 | 5/2011 | Khor et al. |
| 8,036,892 B2 | 10/2011 | Broman et al. |
| 8,112,278 B2 | 2/2012 | Burke |
| 8,537,978 B2 | 9/2013 | Jaiswal et al. |
| 2001/0026632 A1 | 10/2001 | Tamai |
| 2002/0099649 A1 | 7/2002 | Lee et al. |
| 2003/0147516 A1 | 8/2003 | Lawyer et al. |
| 2003/0208684 A1 | 11/2003 | Camacho et al. |
| 2004/0029087 A1 | 2/2004 | White |
| 2004/0111305 A1 | 6/2004 | Gavan et al. |
| 2004/0131160 A1 | 7/2004 | Mardirossian |
| 2004/0203575 A1 | 10/2004 | Chin et al. |
| 2004/0240631 A1 | 12/2004 | Broman et al. |
| 2005/0043014 A1 | 2/2005 | Hodge |
| 2005/0125226 A1 | 6/2005 | Magee |
| 2005/0125339 A1 | 6/2005 | Tidwell et al. |
| 2005/0185779 A1 | 8/2005 | Toms |
| 2006/0106605 A1 | 5/2006 | Saunders et al. |
| 2006/0161435 A1 | 7/2006 | Atef et al. |
| 2006/0212407 A1 | 9/2006 | Lyon |
| 2006/0212925 A1 | 9/2006 | Shull et al. |
| 2006/0248019 A1 | 11/2006 | Rajakumar |
| 2006/0282660 A1 | 12/2006 | Varghese et al. |
| 2006/0285665 A1 | 12/2006 | Wasserblat et al. |
| 2006/0289622 A1 | 12/2006 | Khor et al. |
| 2006/0293891 A1 | 12/2006 | Pathuel |
| 2007/0041517 A1 | 2/2007 | Clarke et al. |
| 2007/0074021 A1 | 3/2007 | Smithies et al. |
| 2007/0124246 A1 | 5/2007 | Lawyer et al. |
| 2007/0280436 A1 | 12/2007 | Rajakumar |
| 2007/0282605 A1 | 12/2007 | Rajakumar |
| 2008/0010066 A1 | 1/2008 | Broman et al. |
| 2008/0195387 A1 | 8/2008 | Zigel et al. |
| 2009/0046841 A1 | 2/2009 | Hodge |
| 2009/0119106 A1 | 5/2009 | Rajakumar et al. |
| 2009/0147939 A1 | 6/2009 | Morganstein et al. |
| 2009/0254971 A1 | 10/2009 | Herz et al. |
| 2010/0228656 A1 | 9/2010 | Wasserblat et al. |
| 2010/0303211 A1 | 12/2010 | Hartig et al. |
| 2010/0305946 A1 | 12/2010 | Gutierrez et al. |
| 2010/0305960 A1 | 12/2010 | Gutierrez et al. |
| 2011/0026689 A1 | 2/2011 | Metz et al. |
| 2011/0191106 A1 | 8/2011 | Khor et al. |
| 2011/0255676 A1 | 10/2011 | Marchand et al. |
| 2011/0320484 A1 | 12/2011 | Smithies et al. |
| 2012/0253805 A1 | 10/2012 | Rajakumar et al. |
| 2012/0263285 A1 | 10/2012 | Rajakumar et al. |
| 2012/0284026 A1 | 11/2012 | Cardillo et al. |
| 2013/0197912 A1 | 8/2013 | Hayakawa et al. |
| 2013/0253919 A1 | 9/2013 | Gutierrez et al. |

FOREIGN PATENT DOCUMENTS

| | | |
|---|---|---|
| WO | 0077772 | 12/2000 |
| WO | 2006013555 | 2/2006 |
| WO | 2007001452 | 1/2007 |

OTHER PUBLICATIONS

Office Action, Jan. 13, 2014, U.S. Appl. No. 13/898,679, May 21, 2013.

* cited by examiner

Figure 10: Date Ranges of Fraud Activity by fraudsters

Figure 11 – Number of affiliates used by fraudsters

SYSTEMS, METHODS, AND MEDIA FOR DETERMINING FRAUD PATTERNS AND CREATING FRAUD BEHAVIORAL MODELS

CROSS-REFERENCE TO RELATED APPLICATIONS

This application is a continuation-in-part and claims benefit of and priority to U.S. patent application Ser. No. 11/754,974, filed on May 29, 2007, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints;"

this application is also a continuation-in-part and claims benefit of and priority to U.S. patent application Ser. No. 11/754,975, filed on May 29, 2007, entitled "Method and System to Seed a Voice Database," which in turn claims the benefit of and priority to U.S. Provisional Applications 60/923,195, filed on Apr. 13, 2007, entitled "Selecting Techniques and Geographical Optimization Details for a Fraud Detection System that uses Voiceprints," and 60/808,892, filed on May 30, 2006, entitled "Optimizations for a Fraud Detection System that uses Voiceprints;"

this application is also a continuation-in-part and claims benefit of and priority to U.S. patent application Ser. No. 12/352,530, filed on Jan. 12, 2009, entitled "BUILDING WHITELISTS COMPRISING VOICEPRINTS NOT ASSOCIATED WITH FRAUD AND SCREENING CALLS USING A COMBINATION OF A WHITELIST AND BLACKLIST," which in turn claims the benefit of and priority to U.S. Provisional Applications 61/197,848, filed Oct. 31, 2008, entitled "Voice biometrics based fraud management system," and 61/010,701, filed Jan. 11, 2008, entitled "Optimizations & extensions of a system to detect fraud using voiceprints;"

this application is also a continuation-in-part and claims benefit of and priority to U.S. patent application Ser. No. 12/856,200, filed on Aug. 13, 2010, entitled "SPEAKER VERIFICATION-BASED FRAUD SYSTEM FOR COMBINED AUTOMATED RISK SCORE WITH AGENT REVIEW AND ASSOCIATED USER INTERFACE," which in turn claims the benefit of and priority to U.S. Provisional Application 61/335,677, filed on Jan. 11, 2010, entitled "Method for correlating fraud audio to textual fraud reports using word spotting;"

this application is also a continuation-in-part and claims benefit of and priority to U.S. patent application Ser. No. 12/856,118, filed on Aug. 13, 2010, entitled "METHOD AND SYSTEM FOR GENERATING A FRAUD RISK SCORE USING TELEPHONY CHANNEL BASED AUDIO AND NON-AUDIO DATA," which in turn claims the benefit of and priority to U.S. Provisional Applications 61/335,677, filed on Jan. 11, 2010, entitled "Method for correlating fraud audio to textual fraud reports using word spotting;"

this application is also a continuation-in-part and claims benefit of and priority to U.S. patent application Ser. No. 12/856,037, filed on Aug. 13, 2010, entitled "METHOD AND SYSTEM FOR ENROLLING A VOICEPRINT IN A FRAUDSTER DATABASE," which in turn claims the benefit of and priority to U.S. Provisional Applications 61/335,677, filed on Jan. 11, 2010. Each of the aforementioned Non-Provisional U.S. Patent Applications is a continuation-in-part and claims benefit of and priority to U.S. patent application Ser. No. 11/404,342, filed on Apr. 14, 2006, entitled "Method and system to detect fraud using voice data," which in turn claims the benefit of U.S. Provisional Application 60/673,472, filed on Apr. 21, 2005, entitled "Detecting Fraudulent Use of Financial Account Numbers Using Voiceprints." All of the above references are hereby incorporated by reference herein in their entirety. This application is also a continuation-in-part and claims the benefit of and priority to U.S. patent application Ser. No. 13/278,067, filed on Oct. 20, 2011, entitled "Method and System for Screening Using Voice Data and Metadata," which in turn is a continuation of and claims the benefit of and priority to U.S. patent application Ser. No. 11/754,974, filed on May 29, 2007, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints," all of which are hereby incorporated by reference herein in their entirety.

FIELD OF THE TECHNOLOGY

Embodiments of the disclosure relate to methods and systems for fraud detection. Systems and methods may be utilized to identify fraud patterns within call data (either manually or by way of fraud detection applications) and create fraud behavioral models to detect fraud.

BACKGROUND OF THE DISCLOSURE

Fraud such as credit card fraud and identity fraud are common. To deal with fraud, enterprises such as merchants and banks use a variety of fraud detection systems. However, these fraud detection systems are susceptible to becoming obsolete within a short time because fraudsters change their methods of perpetrating fraud in order to maneuver past such fraud detection systems.

SUMMARY OF THE DISCLOSURE

According to some embodiments, the present technology may be directed to methods for analyzing call data associated with fraudsters. These methods may include executing instructions stored in memory, the instructions executable by a processor, to: (a) in response to receiving call data associated with fraudsters, compare the call data to a corpus of fraud data to determine one or more unique fraudsters associated with the call data; (b) associate the call data with one or more unique fraudsters based upon the comparison; (c) generate one or more voiceprints for each of the one or more identified unique fraudsters from the call data; and (d) store the one or more voiceprints in a database.

In other embodiments, the present technology may be directed to methods for identifying fraud patterns in call data that include executing instructions stored in memory, the instructions executable by a processor, for: (a) analyzing call data associated with fraudsters utilizing voice recognition techniques, the call data being received by a web server associated with one or more entities; (b) determining keywords included in the call data that are indicative of fraud; (c)

identifying fraud patterns from the keywords; and (d) storing the fraud patterns in a database communicatively coupled with the web server.

In other embodiments, the present technology may be directed to systems for identifying fraud patterns in call data. These systems may include (a) a memory for storing executable instructions; (b) a processor for executing the instructions, the executable instructions including: (a) an analytics engine that analyzes call data associated with fraudsters utilizing voice recognition techniques, the call data being received by a web server associated with one or more entities; and determines keywords included in the call data that are indicative of fraud; and (b) a fraud pattern identifying module that identifies fraud patterns from the keywords and stores the fraud patterns in a database communicatively coupled with the web server.

In other embodiments, the present technology may be directed to non-transitory computer readable storage media having a program embodied thereon. In some embodiments, the program is executed by a processor to perform a method for analyzing call data. These methods may include: (a) responsive to receiving call data associated with fraudsters, compare the call data to a corpus of fraud data to determine one or more unique fraudsters associated with the call data; (b) associate the call data with one or more unique fraudsters based upon the comparison; (c) generate one or more voiceprints for each of the one or more identified unique fraudsters from the call data; and (d) store one or more voiceprints in a database.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Broadly, the present disclosure provides for systems and methods configured to identify fraud patterns and create Fraud Behavioral Models (FBMs) relating to fraudsters. It will be understood that fraudsters may be a part of a community that perpetrates fraud by illicitly using information of certain individuals for their (the fraudsters) own benefit. The information may include any type of sensitive information, such as social security numbers, credit card details, and so forth, which may be used by the fraudster to perpetrate fraud. Common types of fraud may include the unauthorized use of credit card data, for example, the use of a credit card without the consent of the name cardholder.

A pattern of fraud perpetrated by the fraudsters may be understood by identifying fraud patterns, whereas a pattern of behavior of a fraudster (who perpetrated one or more frauds) may be understood by identifying a FBM. In other words, the fraud patterns may provide information relating to a fraud activity, whereas the FBM may provide information relating to particular fraudsters or groups of fraudsters.

For example, fraud patterns may provide details about a frequency of fraud, a time and a date of fraud, repeated voice accents used to perpetrate fraud, phone numbers called from, a number of calls made, details of the enterprises being victimized, and the like. On the other hand, an FBM analysis may provide details about behavioral characteristics of a fraudster. For example, behavioral characteristics may answer the follow questions about a fraudster: Does the fraudster always use a new account for making a transaction, does the fraudster always order a same item, does the fraudster always order a same number of an item, does the fraudster always choose for express shipping, and the like. Advantageously, fraud patterns and FBMs may be used by an enterprise to understand methods/techniques used to perpetrate fraud and behavioral characteristics of fraudsters. An enterprise may utilize these fraud patterns and FBMs to prevent fraud in future by screening new callers against the fraud patterns and FBMs.

Figure 1:
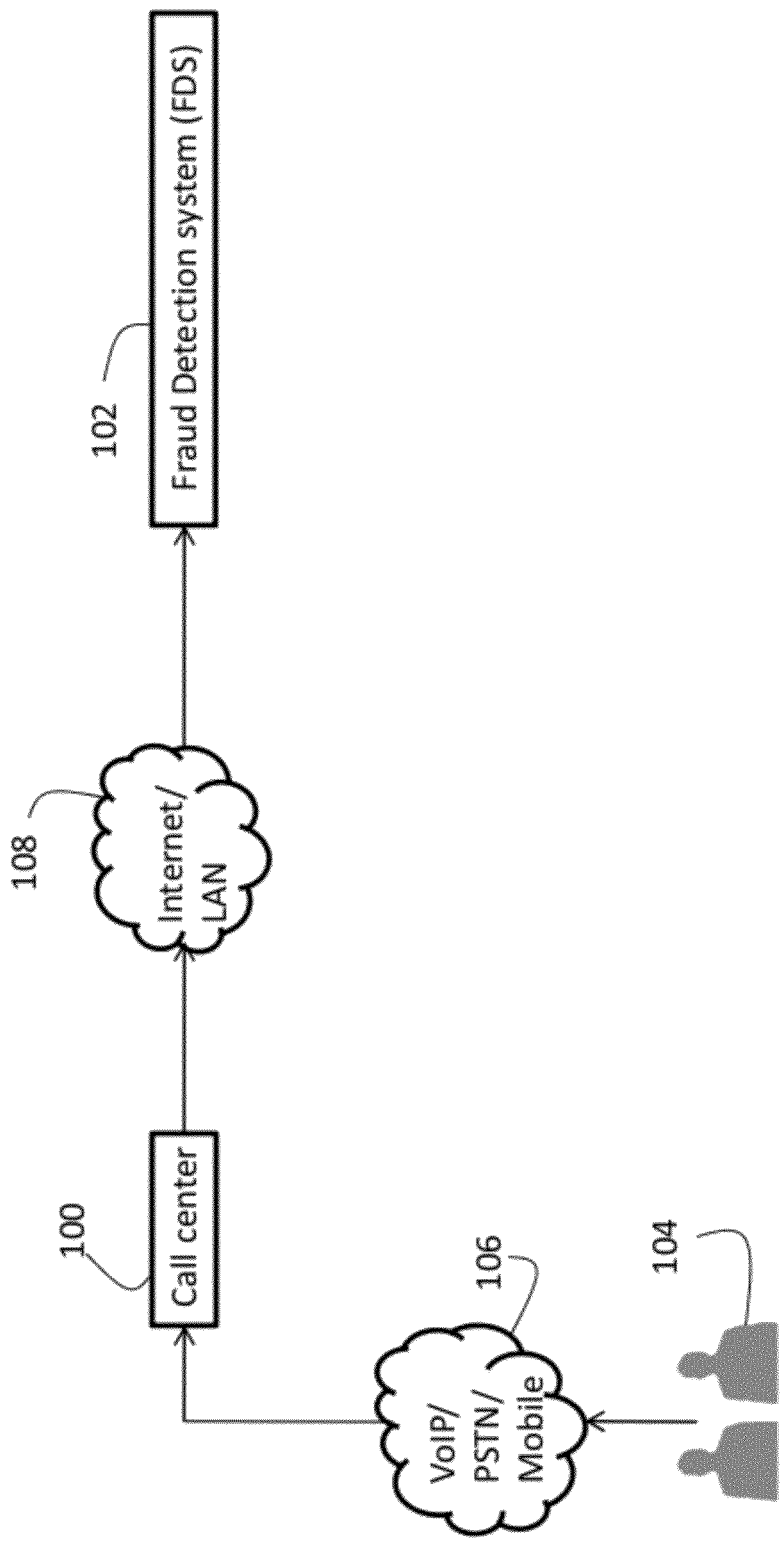
FIG. 1 is a pictorial representation of an exemplary system for fraud detection, in accordance with various embodiments of the present disclosure.

Referring to FIG. 1, a pictorial representation of an exemplary implementation of a system for fraud detection is shown, in accordance with various embodiments of the present disclosure. As can be seen from FIG. 1, a call center 100, a Fraud Detection System (FDS) 102, and a plurality of callers 104 are shown. The call center 100 may receive and process calls on behalf of an enterprise. The enterprise may include a merchant, an insurance company, an affiliate of a company, a bank, a telecommunication company, and the like.

According to some embodiments, the call center 100 may receive calls from the plurality of callers 104 (hereinafter "the callers 104") for goods and/or services that the enterprise deals in. The callers 104 may call the call center 100 using a VoIP/Public Switched Telephone Network (PSTN)/mobile network 106. The calls from the callers 104 may be recorded by the call center 100 for fraud detection. It will be understood that the callers 104 may include legitimate customers and fraudsters.

The callers 104 may request call center agents (who receive phone calls) to process transactions related to goods/services. In some embodiments, the call center 100 may apply one or more business rules to decide to call to determine whether to process a transaction directly or to have a fraud check performed on the caller.

For example, an exemplary business rule may require all transactions above $20 to be fraud checked. If the call center 100 decides to perform a fraud check, the call center 100 may initiate the recording of the call to generate call data of the caller 104. The terms "call data" may be understood to include not only audio data, but other types of data such as caller identification (e.g., the phone number the caller called from), a dialed number identification service information (e.g., phone number the caller dialed, agent identification (e.g., the agent that handled the call, timestamp-date and time of call), type of call (e.g., subject matter of the call), an account or order identification (e.g., some unique transaction or account identifier that the call was in reference to), and a shipping zip code (e.g., if a product was to be delivered to a particular location), and so forth. The above-described examples of call data are to be understood to be non-limiting, and one of ordinary skill in the art will appreciate that many other types of call data may likewise be utilized in accordance with the present technology.

In some embodiments, all callers are recorded automatically, and call data is generated for all calls, or only a portion of the recorded calls.

The call center 100 may communicate the call data to the Fraud Detection System (hereinafter "FDS 102") using Internet/LAN 108. The FDS 102 may perform a fraud check on the caller and may produce a fraud check result as described in greater detail below. It will be understood that the FDS 102 may detect any type of fraud; however, for the purposes of brevity, the present disclosure focuses on fraud perpetrated fraudsters utilizing telephonic devices.

Figure 2:
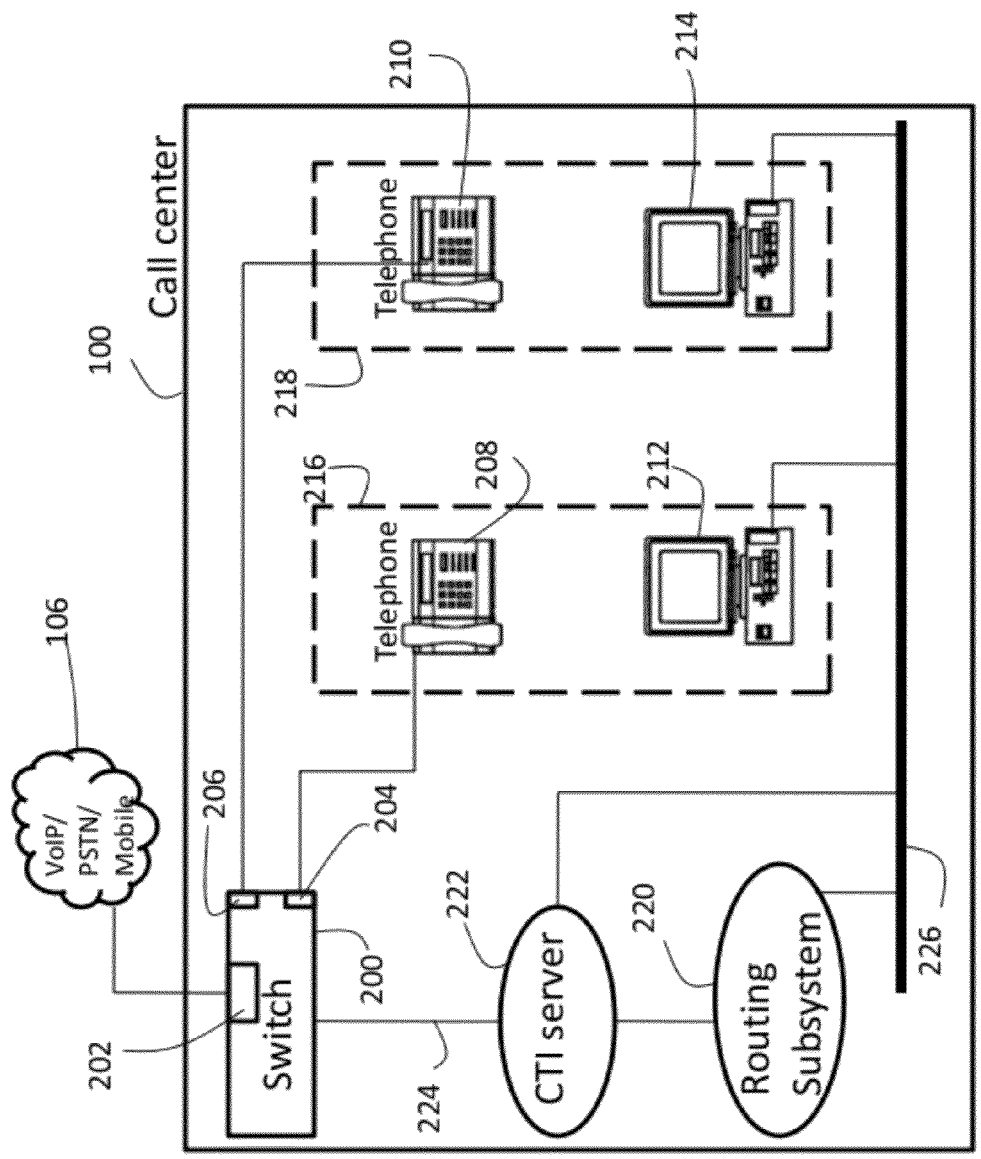
FIG. 2 shows an exemplary architecture of a call center of FIG. 1, in accordance with various embodiments of the present disclosure.

Referring now to FIG. 2, an exemplary architecture for the call center 100 of FIG. 1 is shown. The call center 100 may comprise a switch 200 for accepting calls via the VoIP/PSTN/mobile network 106 from the callers 104. The switch 200 may contain a high bandwidth port 202 that is communicatively coupled with the network 106 and a plurality of low bandwidth ports such as ports 204 and 206 communicatively coupled with telephones 208 and 210, respectively. The telephones 208 and 210 may be communicatively coupled with workstations 212 and 214. It is noteworthy to mention that these workstations may be made available to each agent, respectively.

A telephone and a corresponding workstation may cooperate together to form an integral unit, such as integral units 216 and 218. Each integral unit may be managed by one or more call center agents (hereinafter "the agent"). It may be understood that the call center 100 may have more than two integral units. Further, the call center 100 may include a routing subsystem 220 communicatively coupled with a CTI server 222 which is in turn communicatively coupled with the switch 200 through a CTI link 224. In order to facilitate data communication, a communication network 226 may be used to digitally couple the routing subsystem 220, the CTI server 222, and the switch 200. It may be understood that in another embodiment, the call center 100 may have a different architecture without deviating from the scope of the present disclosure.

In some embodiments, the workstations 212 and 214 may be configured to record conversations between the callers 104 and the agents. The call data may be sent to the FDS 102 for fraud detection.

Figure 3:
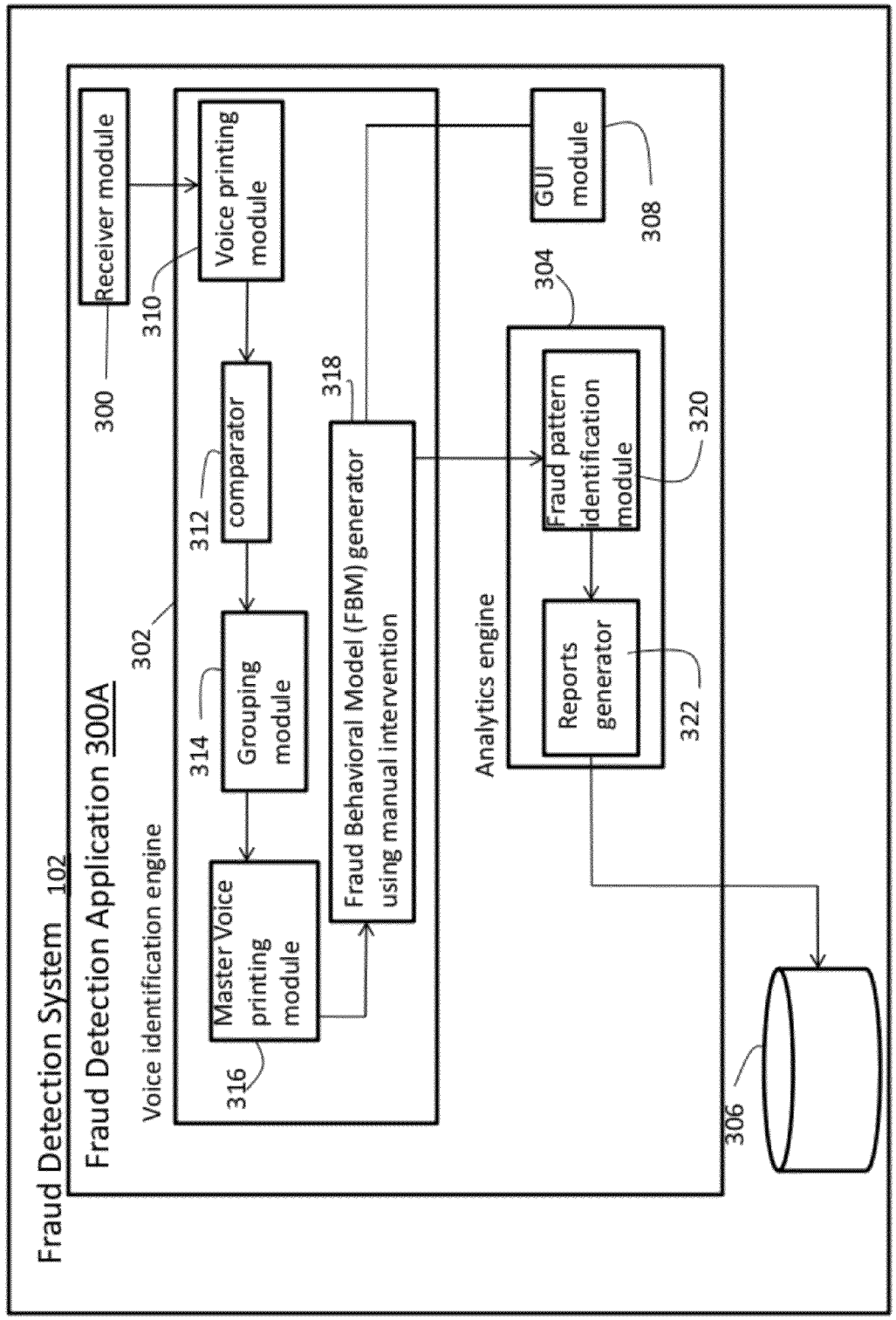
FIG. 3 shows an exemplary architecture of a Fraud Detection System of FIG. 1, in accordance with various embodiments of the present disclosure.

Referring now to FIG. 3, an exemplary architecture of the FDS 102 of FIG. 1 is shown. The FDS 102 may include a web server (or group of web servers associated together in a cloud computing arrangement) that utilize or execute executable instructions that are configured to identify fraud patterns and create fraud behavior models from call data.

According to some embodiments, the executable code may include a fraud detection application, hereinafter referred to as "application 300A." That is, the FDS 102 having the fraud detection application may function as a particular purpose computing system that identifies fraud patterns and creates fraud behavior models from call data.

According to some embodiments, the application 300A may include a receiver module 300, a Voice Identification Engine (VIE) 302, an analytics engine 304, a database 306, and a Graphical User Interface (GUI) module 308.

The receiver module 300 may receive call data communicated thereto by at least one of the workstations 212 and 214. Further, the receiver module 300 may communicate the call data to the VIE 302 for uniquely identifying fraudsters in the call data. The VIE 302 includes a voice printing module 310, a comparator 312, a grouping module 314, a master voice printing module 316, and a Fraud Behavioral Model (FBM) generator 318.

It is noteworthy that the FDS 102 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational module circuit, and/or other suitable components that provide the described functionality. In other embodiments, individual modules of the FDS 102 may include separately configured web servers.

Additionally, as used herein, the term "module" may be understood to include computer readable instructions that are executable by a processor of a computing system to affect one or more particular functionalities. For example, the voice print module may be executed by a processor to generate a voice print of call data. In some embodiments, the VIE 302 may create voiceprints for each fraudster in each of the call data using the voice printing module 310. Subsequently, the comparator 312 may compare the voiceprint generated by the voice print module 310 with voiceprints of other fraudsters in an attempt to determine a match.

According to some embodiments, the VIE 302 may group matching voiceprints together utilizing the grouping module 314. The grouping module 314 may form a plurality of groups of voiceprints, each belonging to a unique fraudster. In other embodiments, call data corresponding to each voiceprint may also be grouped together. Each group of voiceprint may be represented by a Master Voice Print (MVP). A MVP for each group of voiceprints may be created by the Master Voice Printing module 316. The MVP may be screened against voiceprints resident within database 306 to determine which voiceprints match a master voiceprint.

Further, a fraud behavioral model, hereinafter "FBM," may be generated for each unique fraudster. In some embodiments, the FBM may be created by the FBM generator 318 which uses a live agent (human being) that listens to call data present in each group via the GUI module 308. After listening to the call data, the live agent may identify or create a FBM for each fraudster. The FBM may provide information about behavioral characteristics of the fraudsters. Since the behavioral characteristic of each fraudster differs, the FBM may distinguish one fraudster from another. The generation and utilization of FBMs is described in greater detail below with reference to FIG. 4.

In other embodiments, the FBM generator 318 may be configured to automatically generate an FBM from call data by identifying keywords, phrases, the presence of sensitive information in the call data, and other similar types of information.

After an FBM has been generated, the groups of call data may be communicated to the analytics engine 304 by the FBM generator 318. The analytics engine 304 includes a Fraud Pattern Identifying (FPI) module 320 and a reports generator 322. The FPI module 320 may be used for identifying fraud patterns for each of the unique fraudsters and the reports generator may be used for generating visual graphical reports based upon the fraud patterns. The utilization of fraud patterns and fraud analytics reports will be explained below in greater detail with reference to FIG. 4.

Further, in some embodiments, a corpus of fraud data may include FBMs, fraud patterns, and fraud analytics reports. This corpus of fraud data may be provisioned into the FDS 102 and may be stored in the database 306. These provisioned FBMs, fraud patterns, and fraud analytics reports may be utilized as a corpus of fraud data against which newly gathered voiceprints may be compared.

Figure 4A:
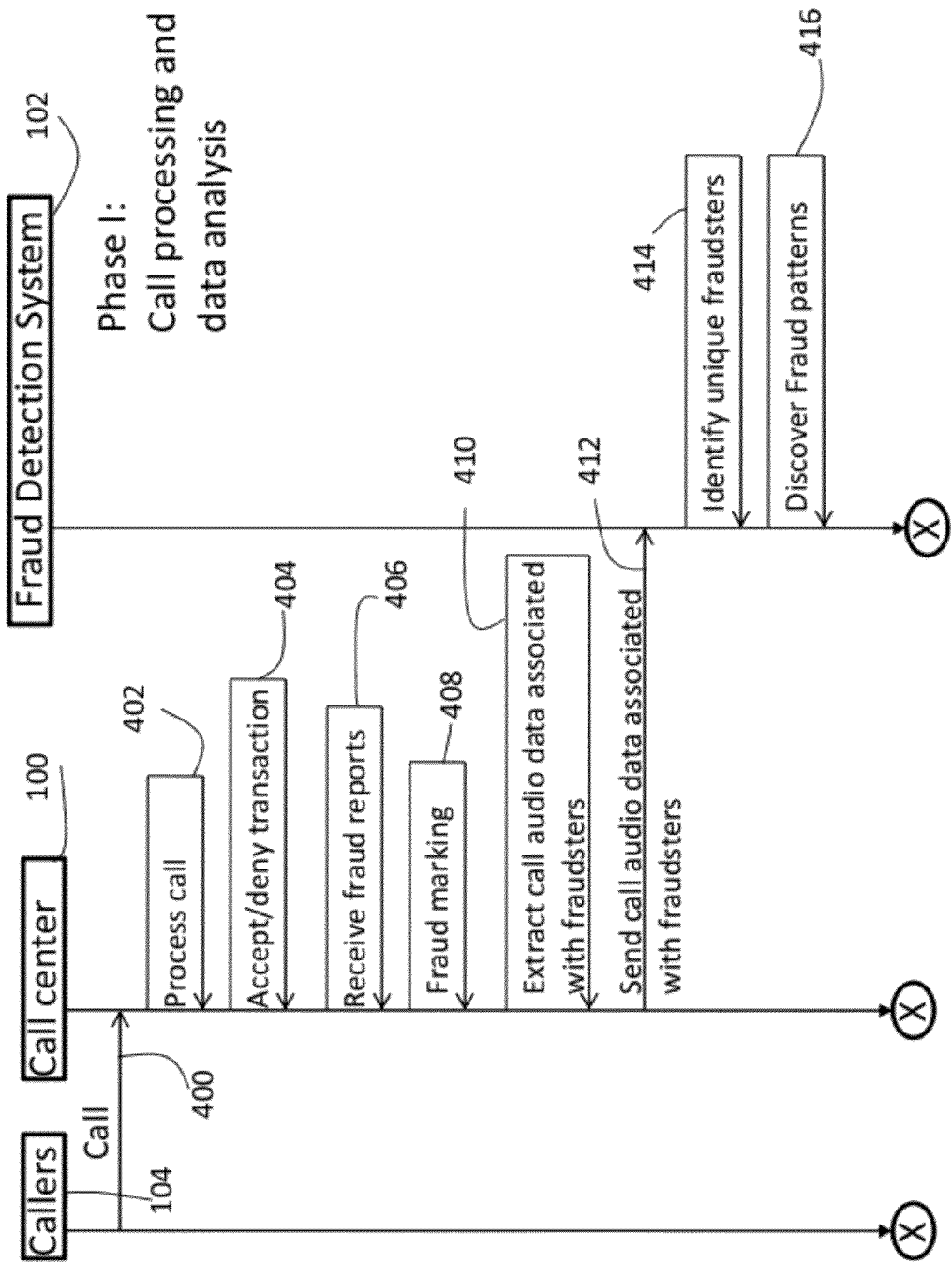
FIGS. 4A and 4B illustrate an exemplary timing diagram that illustrates a sequence of events in an exemplary method for fraud detection, in accordance with various embodiments of the present disclosure.
Figure 4B:
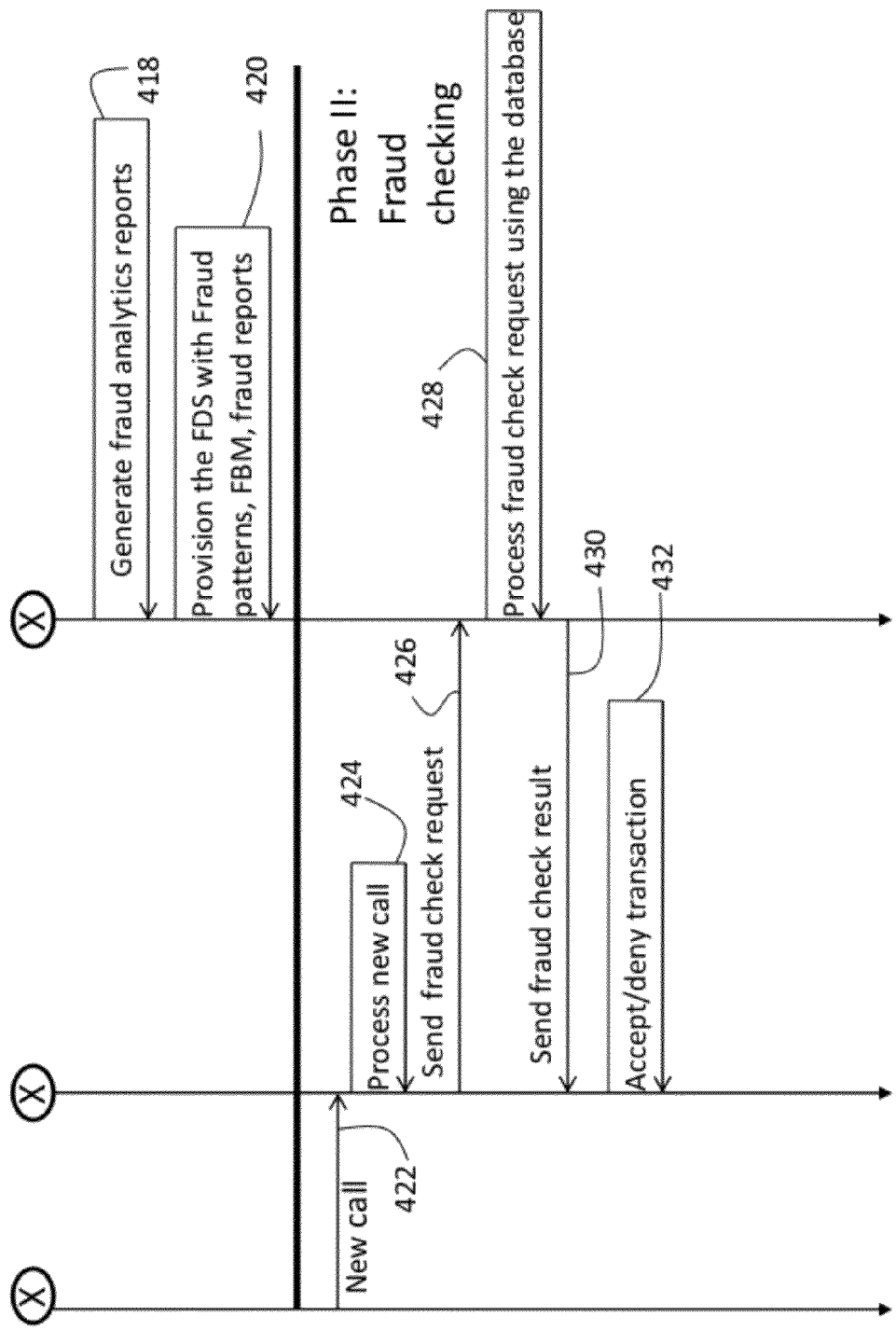

Referring now to FIGS. 4A and 4B, an exemplary timing diagram illustrating a sequence of events in an exemplary method for fraud detection is shown. Specifically, FIG. 4A shows that, at 400, the callers 104 may call the call center 100. At 402, the calls may be processed by the call center 100. Call processing may include receiving the call, taking an order from the caller, and recording the call. At 404, the call center may accept or deny transactions based on a business rule. For example, the business rule may advocate acceptance of all transactions below a threshold amount (e.g., twenty dollars). However, for transactions above a threshold amount, the call center 100 may request that a fraud check be performed using a prior art fraud checking system (not shown). The prior art fraud checking system may perform a fraud check on the caller using known techniques. If the prior art fraud checking system reveals a suspicious or potentially fraudulent transaction, the call may be routed to the call center 100 for further processing. Since the prior art fraud checking systems may be inaccurate and/or inadequate, some of the transactions that are approved by the prior art fraud checking system may, in fact, be fraudulent transactions.

Therefore, at 406, the call center 100 may receive fraud reports from credit card companies for these fraudulent transactions. In one embodiment, the fraud reports received by the call center 100 may be analyzed and indexed by the workstations 212 and 214. Fraud reports may be associated with particular credit cards numbers, transaction numbers, social security numbers that are known to have been used fraudulently. These types of fraud data may be utilized as reference data to compare against future call data.

Because fraud techniques vary, it is apparent that many other types of fraud data that correspond to fraudulent transactions (e.g., names, locations, accents, and so forth) may also be utilized by the systems provided herein. Therefore, other types of fraudulent data that would be known to one of ordinary skill in the art with the present disclosure before them are likewise contemplated for use in accordance with the present technology.

Figure 5:
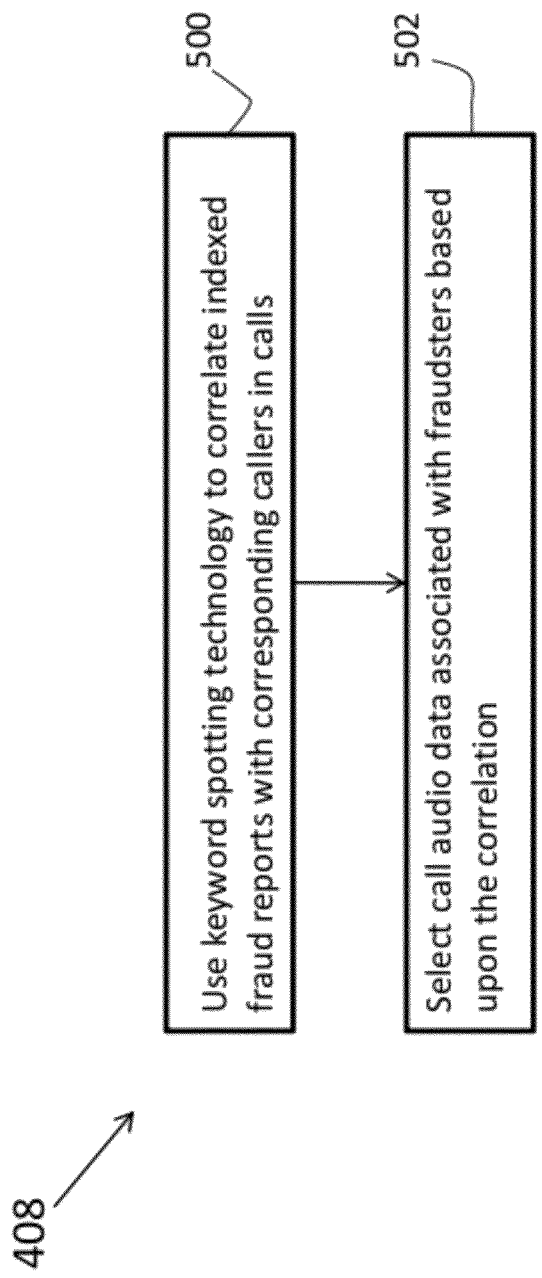
FIG. 5 shows an exemplary flowchart illustrating fraud marking, in accordance with various embodiments of the present disclosure.

Using the indexed fraud reports, the workstations 212 and 214 may perform a function of fraud marking by segregating or parsing call data associated with the fraudsters. Specifically, the workstations 212 and 214 may use keyword spotting technology to correlate indexed fraud reports with corresponding callers and then select call data associated with fraudsters based upon the correlation as shown in the exemplary flowchart of FIG. 5.

More specifically, keyword spotting technology may be used to analyze call data, determine valuable information from call data automatically, and indicate whether specific keywords were mentioned during the call or not. For example, the keyword spotting technology may be used to find a usage of a credit card number in a call data, thereby correlating the call data with a fraud report having the same credit card number.

Figure 6:
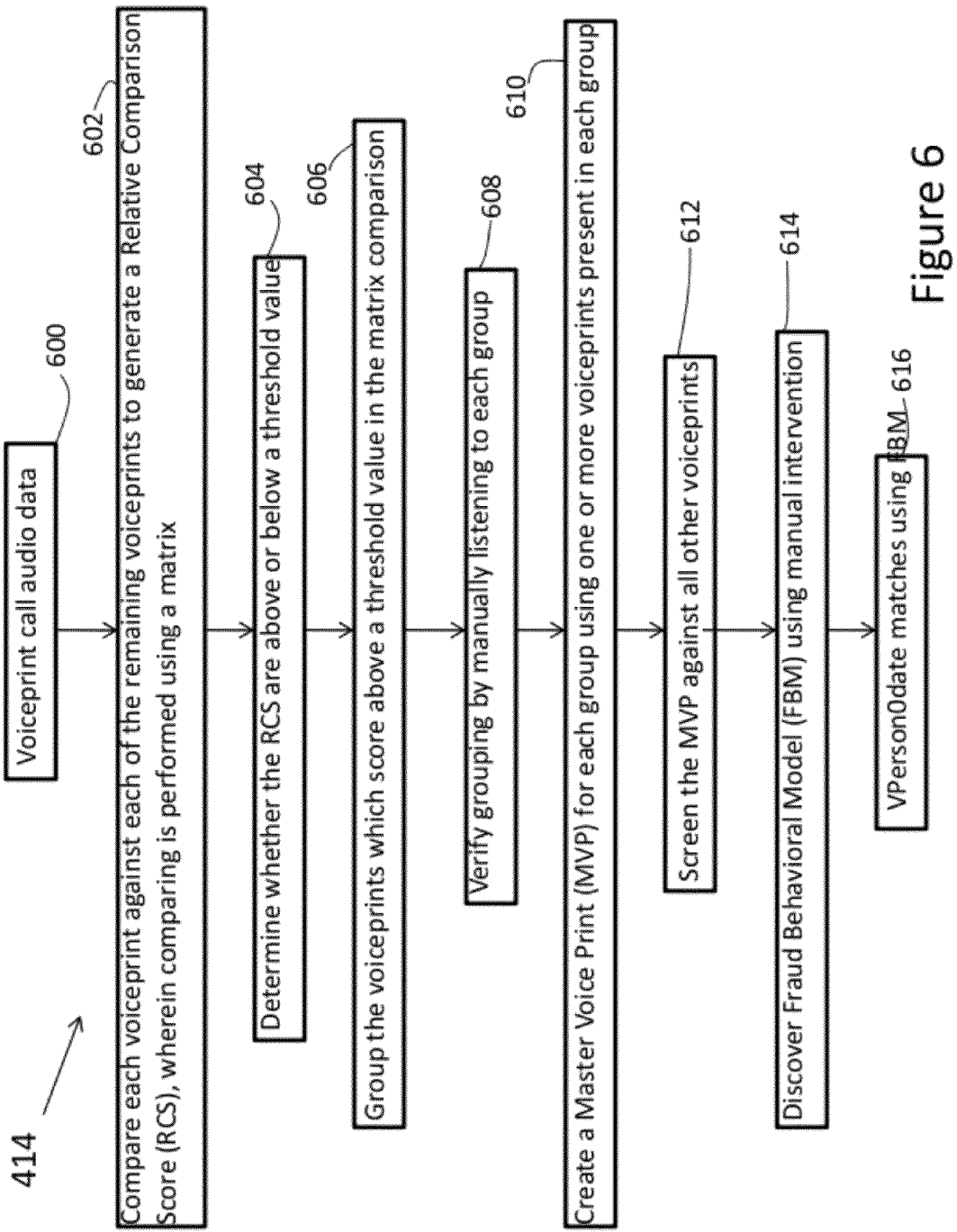
FIG. 6 shows an exemplary flowchart illustrating identifying unique fraudsters, in accordance with various embodiments of the present disclosure.

Based upon the fraud marking, at 410, the workstations 212 and 214 may generate a recording of call data associated with fraudsters. At 412, the workstations 212 and 214 may transfer the call data associated with fraudsters to the FDS 102. The receiver module 300 in the FDS 102 may receive the call data and communicate the same to the VIE 302. The VIE 302 may uniquely identify fraudsters in the call data as explained in a flowchart in FIG. 6. Specifically, at 600, the VIE 302 may create a voiceprint for each fraudster in the call data using the voice printing module 310.

It will be understood that a voiceprint is a mathematical model which is created by extracting features from the call data. A voiceprint may be created by applying one or more types of voice recognition algorithms to call data. Subsequent to the creation of voiceprints for the instant call data, the VIE 302 may compare and score each previously received voiceprint against each of the remaining voiceprints resident in the storage media of the FDS 102 using the comparator 312.

Figure 7:
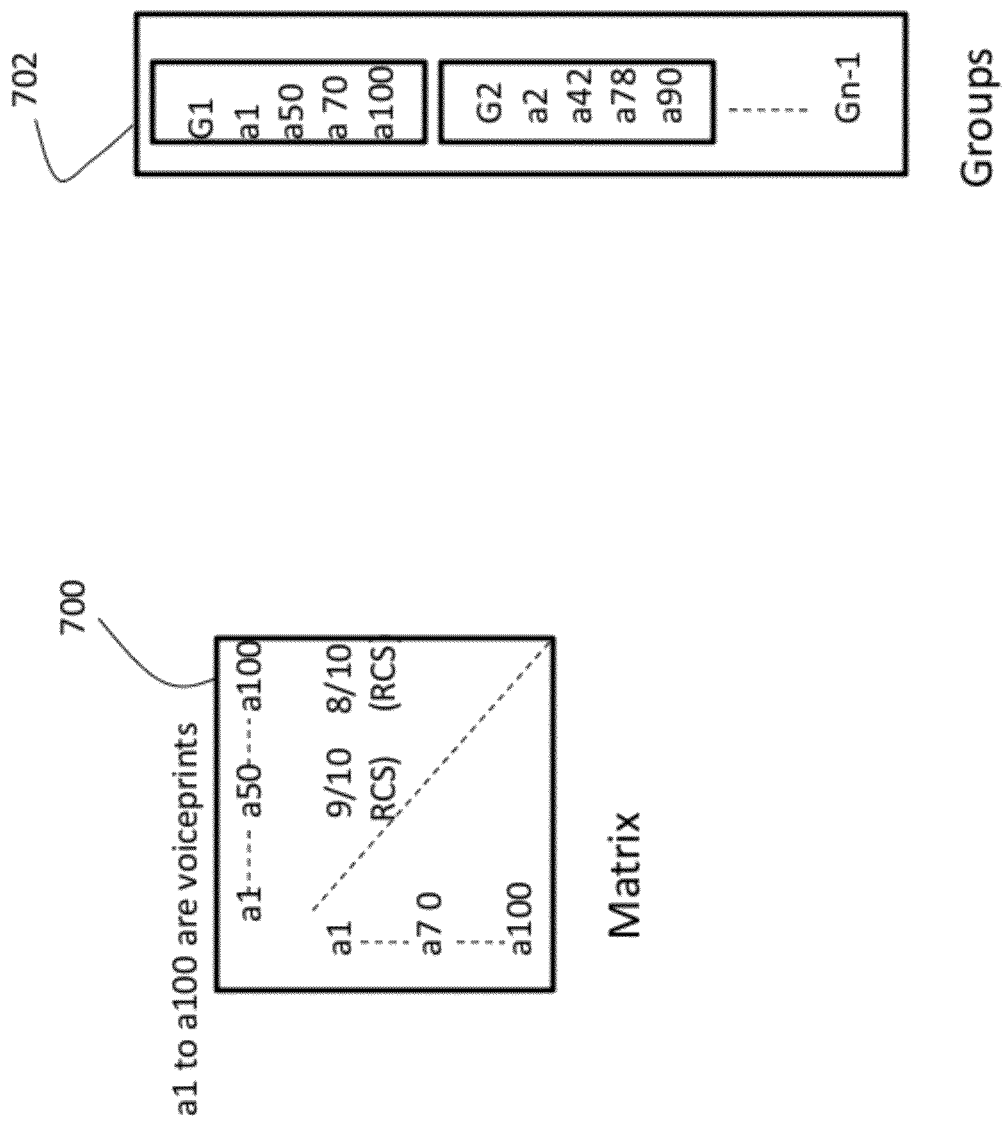
FIG. 7 shows an exemplary matrix comparison of voiceprints; and groups of voiceprints formed after the matrix comparison, in accordance with various embodiments of the present disclosure.

In one example, the voiceprints may be compared and scored in the following manner: Consider a total number of voiceprints to be N, where N=100 and the voiceprints are from a1 to a100. The voiceprints may be compared using a matrix 700 as shown in FIG. 7. The matrix 700 may be arranged such that the voiceprints a1 to a100 are disposed vertically and horizontally as shown. This arrangement of voiceprints may help in easy visual comparison of voiceprints.

During a comparison process of the voiceprints, a Relative Comparison Score (RCS) may be generated for each unique voiceprint. For example, a first voiceprint generated from a first call data may be compared to each of the voiceprints generated from additional voiceprints that are stored in the FDS 102. Individual comparisons between a first voiceprint and a second voiceprint data may be generated (along with other additional voiceprints).

An RCS gives an indication of similarity between any two voiceprints. A high RCS may indicate a high degree of similarity between two voiceprints. In the present example, the first voiceprint a1 is compared with the additional voiceprints a2 to a100 in a first round of comparison. During the first round, it may be found that while comparing a1 and a50, both the voiceprints have similar features. For example, an RCS of 9/10 may be assigned to this pair of voiceprints. Therefore, voiceprints a1 and a50 may be considered to be a match (or substantially similar enough to be considered a match). Similarly, when voiceprints a1 and a100 are compared, an RCS of 8/10 may be assigned to this pair of voiceprints. In a second round of comparison, a2 may be compared with voiceprints a3 to a100, and so on.

At 604, the comparator 312 may determine whether the RCS is above or below a threshold value (for example 70%) or not. Specifically, the comparator 312 may mark all voiceprint pairs which have an RCS above the threshold value in a round. At 606, the marked pair of voiceprints belonging to a same round may be grouped together by the grouping module 314. Therefore, each group of voiceprints may be considered to belong to a unique fraudster. For example, FIG. 7 shows a plurality of groups 702 such as group G1 and group G2. In group G1, voiceprints a1, a50, a70, a100 are present because their RCS was above the threshold value (i.e. 70%). Further, the group G1 may also contain call data corresponding to voiceprint a1, a50, a70, and a100. Similarly, in group G2, voiceprints a2, a42, a78, and a 90 are present because their RCS was above the threshold value, unique fraudsters.

At 608, the groups formed by the grouping module 314 may be verified with the help of the live agent. Specifically, the live agent may listen to the call data. After listening to each of the call data, the live agent may verify whether the groups formed by the grouping module 314 are accurate or not on the basis of voice characteristics and voice features (i.e., how a particular person sounds). In other words, the live agent may verify whether voiceprints of a same fraudster are grouped together or not. After the verification of the groups by the live agent, a master voiceprint may be created for each group of voiceprints at 610. The master voiceprints may be created by the master voice printing module 316. A master voiceprint may represent a group of voiceprints and may be created from one or more voiceprints present in a group of voiceprints.

A master voiceprint may have best voice features/characteristics belonging to a fraudster that are chosen from selected voiceprints. At 612, each of the master voiceprints may be screened against each of the N voiceprints to determine which voiceprints among the N voiceprints match a master voiceprint, thereby asserting that one or more groups of voiceprints belong to a unique fraudster.

For example, consider a master voiceprint M1 for the group of voiceprints G1, wherein M1 is created from the voiceprints present in G1. In the present example, M1 may be screened against all voiceprints present in groups G1, G2, and Gn. During a screening process, it may be found that voiceprints present in G1 match the master voiceprint M1. Similarly, a master voiceprint M2 may match the voiceprints present in G2. Therefore, after the complete screening process, it may be asserted that each group of voiceprints belonged to a unique fraudster. Such verification processes confirm the accuracy of the FDS 102. In one embodiment, steps 610 and 612 are optional. In other words, the steps of creating master voiceprints and then screening the master voiceprints against the N voiceprints may not be performed.

At 614, each group of call data may be utilized by the live agent to create a Fraud Behavioral Model (FBM) for each fraudster. The live agent may use the GUI module 308 to glean information from multiple calls (call data) made by a same fraudster to determine a FBM for said fraudster. The FBM for a fraudster may provide information about behavioral characteristics of the fraudster, thereby distinguishing one fraudster from another. Further, the FBM of a fraudster may provide information about a mode of operation or a method being used by the fraudster to perpetrate fraud.

In some embodiments, a set of parameters may be checked to determine a FBM for a fraudster. For example, when the live agent is listening to the call data present in a group, such as group G1 belonging to a fraudster X, the live agent may check whether the fraudster X always used a new account for making a transaction or not. If the fraudster X used a new account for every transaction he made, then the live agent may conclude that using a new account for every transaction is a behavioral characteristic of the fraudster X.

Further, to determine more about the behavioral characteristics of the fraudster X, the live agent may check whether the fraudster X always ordered a same item or a same number of an item or not. If the fraudster X has ordered a same item or a same number of an item in every transaction he made, then the live agent may conclude that ordering a same item or a same number of an item is a behavioral characteristic of the fraudster X.

Furthermore, the live agent may check whether the fraudster X always chose for express shipping, and whether the fraudster X always changed shipping address, and whether the fraudster X always asked for delivery on a particular day/time of the week, and whether the fraudster X always cracked same kind of jokes, and whether the fraudster X always used same kind of idioms/words, and whether the fraudster X always called from a same phone number or from a same geographical location, and whether the fraudster X always called from a same type of telephony service (such as VoIP) or not. Based upon the set of parameters mentioned above, more information about the behavioral characteristics of the fraudster X may be determined, thereby revealing a FBM for the fraudster X. The FBM of the fraudsters may be used to detect fraud in future as explained below.

Optionally, the FBMs of the fraudsters may be used to validate the groups formed by the grouping module 314. Specifically, in one example, the live agent may group the voiceprints belonging to fraudsters based upon FBMs of the fraudsters. If the groups formed by the live agent include voiceprints corresponding to the voiceprints grouped by the grouping module 314, then the groups formed by the grouping module 314 may be deemed to be validated at 616. In other words, since each fraudster may exhibit a different FBM, the accuracy of a voiceprint comparison (or groups of voiceprints) generated from call data may be verified using FBM.

According to some embodiments, a group of voiceprints may be validated by the live agent only when the comparator 312 indicates a low confidence (e.g., a low RCS number) for a pair of voiceprints. For example, the comparator 312 may determine that a pair of voiceprints has an RCS of 6.8/10. In this example, the pair of voiceprints may be validated by the live agent using a FBM so as to properly categorize the voiceprints in an appropriate group.

With respect to generating fraud patterns, subsequent to the identification of unique fraudsters, the VIE 302 may transfer call data belonging to the unique fraudsters to the analytics engine 304. At 416, the analytics engine 304 may identify one or more fraud patterns for each of the unique fraudsters. Specifically, the analytics engine 304 may use the Fraud Pattern Identifying (FPI) module 320 to identify fraud patterns from the groups of the call data belonging to the unique fraudsters.

The fraud patterns may provide details of fraud such a frequency of fraud such as how many times did a fraudster perpetrate fraud, a time and a date of fraud, common voice accents, or whether fraudsters speak in a certain voice accent, for example Asian voice accents. Fraud patterns may further provide details about phone numbers called from (i.e.

whether fraudsters generally use mobile or landline or VoIP to make calls). Fraud patterns may further provide details about the number of calls made by each fraudster, a number of enterprises being victimized by each fraudster, details of the enterprises being victimized, and accomplice details (i.e., whether the fraudsters operate alone or in rings of association).

At 418, fraud patterns generated by the FPI module 320 may be used by the reports generator 322 to generate exemplary fraud analytics reports as shown in Tables 1-4 and FIGS. 9-12. In some embodiments, fraud analytics reports may include visual graphical reports that illustrate the fraud patterns.

In one embodiment, a list of the unique fraudsters may be used to form a blacklist. The blacklist may contain voiceprints of the unique fraudsters. The blacklist, the fraud analytics reports, and the FBM of each fraudster are provisioned into the storage media (e.g., database 306) associated with the FDS 102.

The database 306 may be used to detect fraud in future calls. Specifically, at 422 the callers 104 may call the call center 100. At 424, the calls may be processed by the call center 100 as explained in FIG. 1. At 426, the call center 100 may communicate a fraud check request along with the call data of the callers to the FDS 102. At 428, the FDS 102 may process the fraud check request. Processing the fraud check request may include screening the call data against voiceprints the database 306 in real time to determine whether the caller is a fraudster.

For example, when a new caller calls the call center 100, his/her name may be screened against the blacklist, his/her behavior model may be screened against the existing FBMs, and his/her method of transaction may be screened against the existing fraud patterns to determine whether the new caller is a fraudster. For example, behavioral models of the new callers may be screened against the existing FBMs of fraudsters to determine whether any of the new callers has a behavioral model (as determined by the live agent) similar to the existing FBMs. If any of the new callers has a similar behavioral model, their transactions may be put under suspect and investigated further. The similarity between the behavioral models of the new callers and the existing FBMs may be determined by the live agent, thereby making the FDS 102 more accurate and reliable. Further, since the FDS 102 may include with a plurality of verification processes such as a blacklist, FBMs, and fraud patterns, the FDS 102 may be used for more accurate analysis of the new caller to determine whether the new caller is a fraudster or not. At 430, the FDS 102 may communicate a fraud check result based upon the processing performed at step 428. At 432, the call center 100 may accept or deny the transaction based upon the fraud check result.

Figure 8:
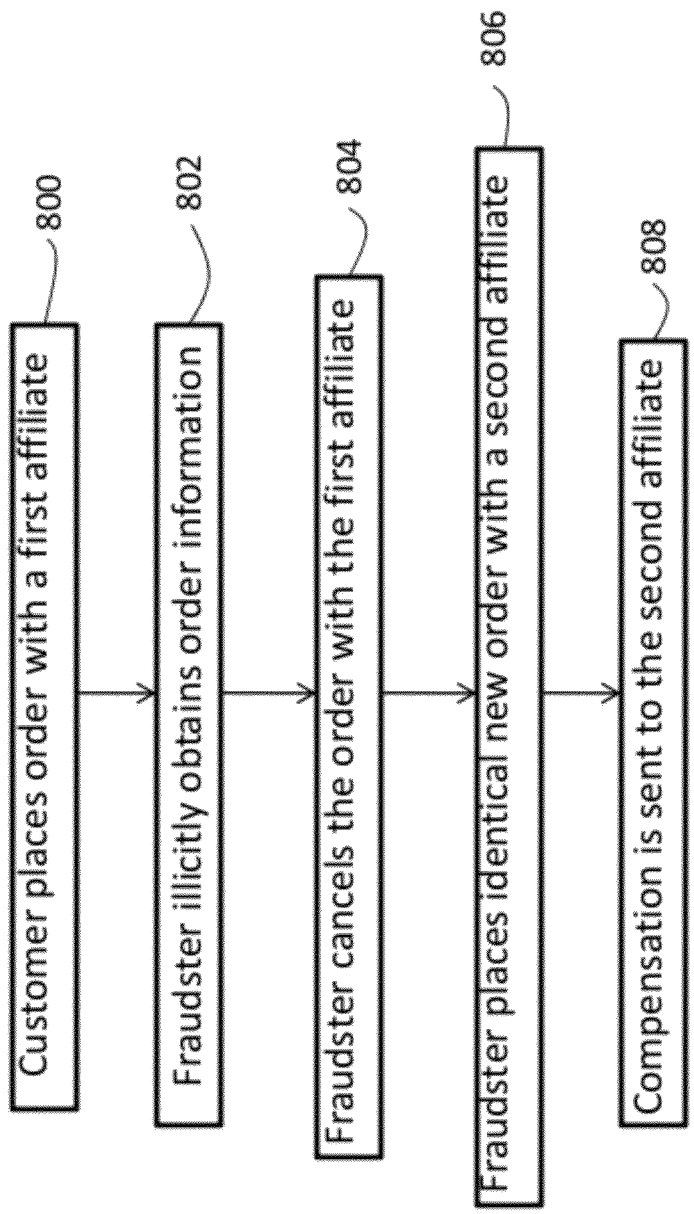
FIG. 8 shows an exemplary flowchart illustrating affiliate fraud, in accordance with various embodiments of the present disclosure.

Advantages of the FDS 102 may be explained with the help of an exemplary case study explained in FIG. 8. The case study involves an affiliate (enterprise) which is victimized by a plurality of fraudsters. Specifically, FIG. 8 illustrates affiliate fraud, and the subsequent FIGS. 9-12 and Tables 1-4 illustrate the use of the FDS 102 by the affiliate to understand fraud patterns previously unknown to the affiliate. The fraud patterns may be used by the affiliate to detect fraud in future. At 800, a legitimate caller may place an order with a first affiliate of an XYZ company for some goods or services. At 802, a fraudster may illicitly obtain order information of the order placed at step 800. At 804, the fraudster may cancel the order in a call to the first affiliate by posing as the legitimate caller. Specifically, the fraudster uses a legitimate caller's identity in the call to cancel the order with the first affiliate. At 806, the fraudster places an identical new order with a second affiliate of the XYZ company. At 808, the second affiliate dispatches the goods or services to the legitimate caller and gets paid. Therefore, in this example, although a sale was generated by the first affiliate, compensation went to the second affiliate. Further, in the present example, it may be inferred that the fraudster works for the second affiliate. This type of fraud may be referred to as affiliate fraud.

To deal with fraud in future, the first affiliate may use the FDS 102 explained above. Specifically, FIGS. 9-12 and Tables 1-4 illustrate a result of the use of the FDS 102 by the first affiliate. The first affiliate may communicate call data associated with fraudsters to the FDS 102. For example, the call data may comprise call recordings 255 belonging to one or more fraudsters. Each of the call data may comprise a recorded audio conversation between a fraudster and a first affiliate's employee.

A receiver module in the FDS 102 may receive the call data transferred thereto by the first affiliate. The receiver module may communicate the call data to a VIE for uniquely identifying fraudsters in the call data.

Individual call data may be analyzed by the system to generate voiceprints, fraud patterns, fraud behavioral models, and so forth from the call data. Analytics may be performed on the call data to generate reports that are indicative of the types of fraud (or FMBs of individual fraudsters) that are perpetrating fraud against the affiliate.

Figure 9:
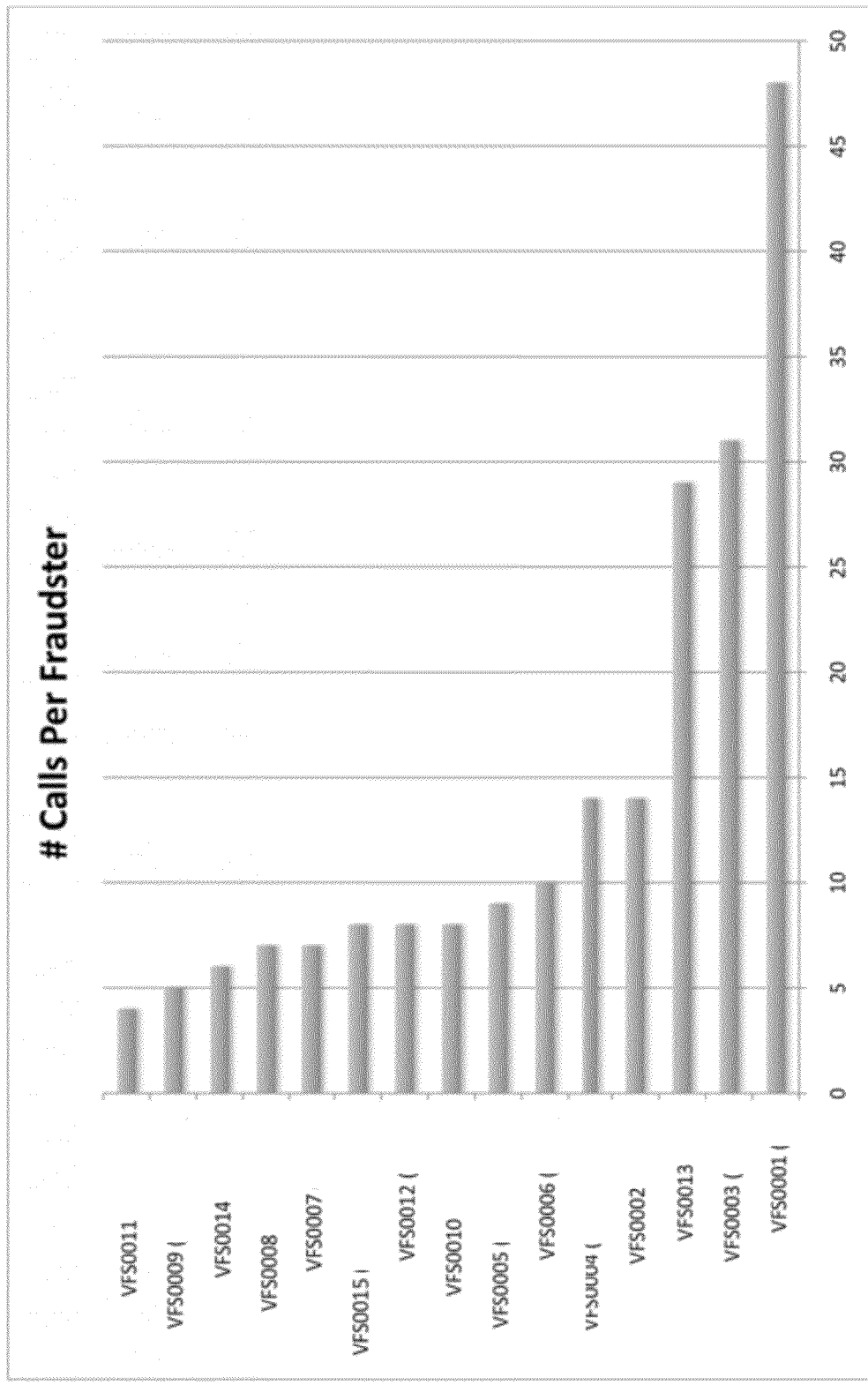
FIGS. 9-12 show exemplary fraud analytics reports illustrating fraud patterns, in accordance with various embodiments of the present technology.

In the present example, the VIE may find that 15 unique individuals/fraudsters accounted for almost 80% of fraud. In other words, a small number of individuals were committing a majority of fraud. Table 1 provides details on the unique fraudsters and FIG. 9 shows a graphical view of the same. Specifically, Table 1 shows that each fraudster is given a unique identifier and also tagged with one of the names that the fraudsters assumed. More specifically, Table 1 and FIG. 9 provide the following information: a) 15 unique fraudsters, b) 13 males, c) 2 females, d) all callers had particular accents, except for one female who had a mixed accent, e) some posed as the customer themselves, others made the calls on behalf of the customer, one individual started off calling in as the affiliate, but then switched over for later calls to pretending to be the customer (VFS0010), f) many used a great deal of military spelling ("A like apple", etc.), indicating a high degree of sophistication interacting with first affiliate's employees or call center agents working for the first affiliate, g) the remaining 20% of the calls were made by fraudsters who made less than 4 calls each.

Figure 10:
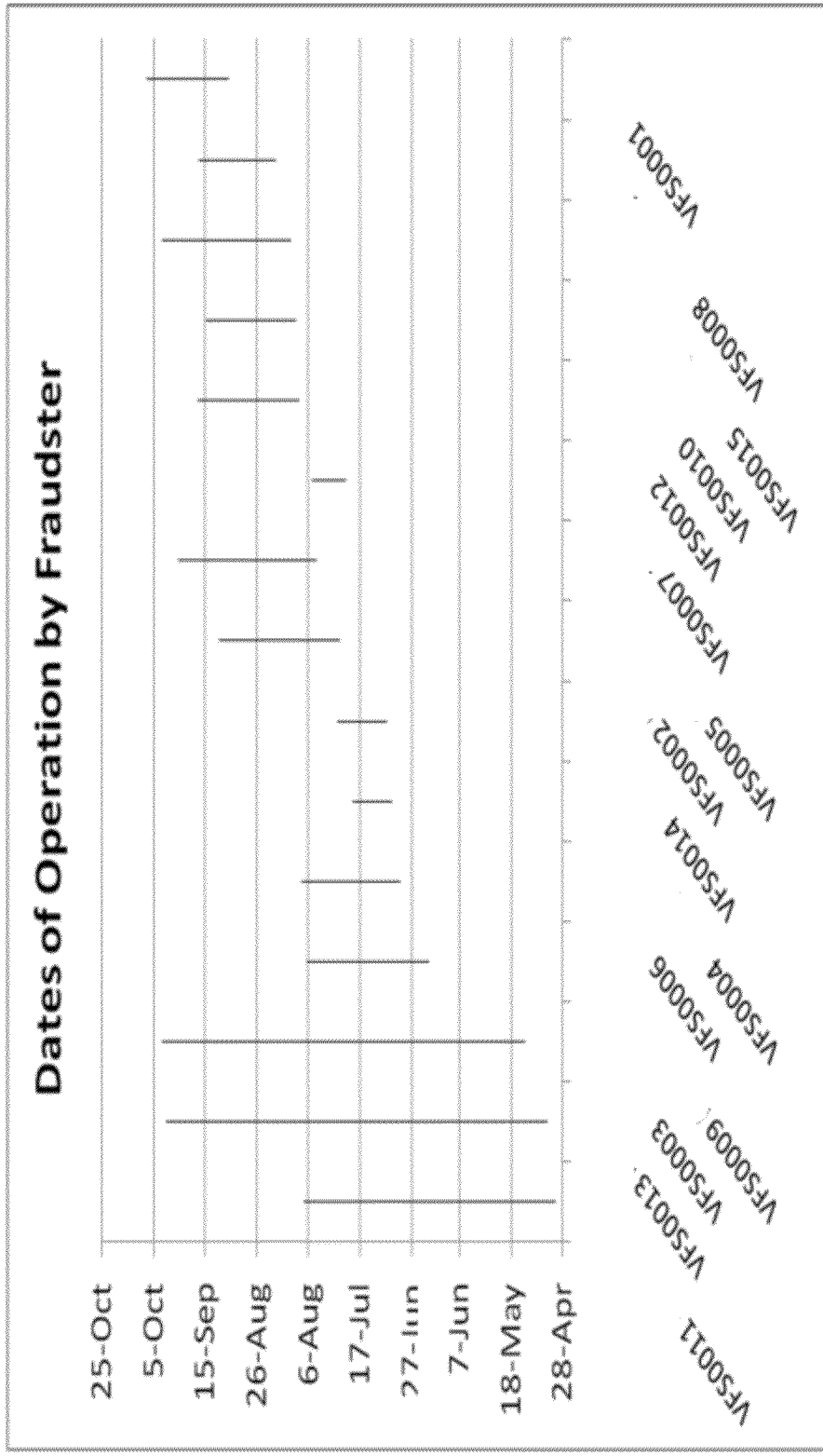
Figure 11:
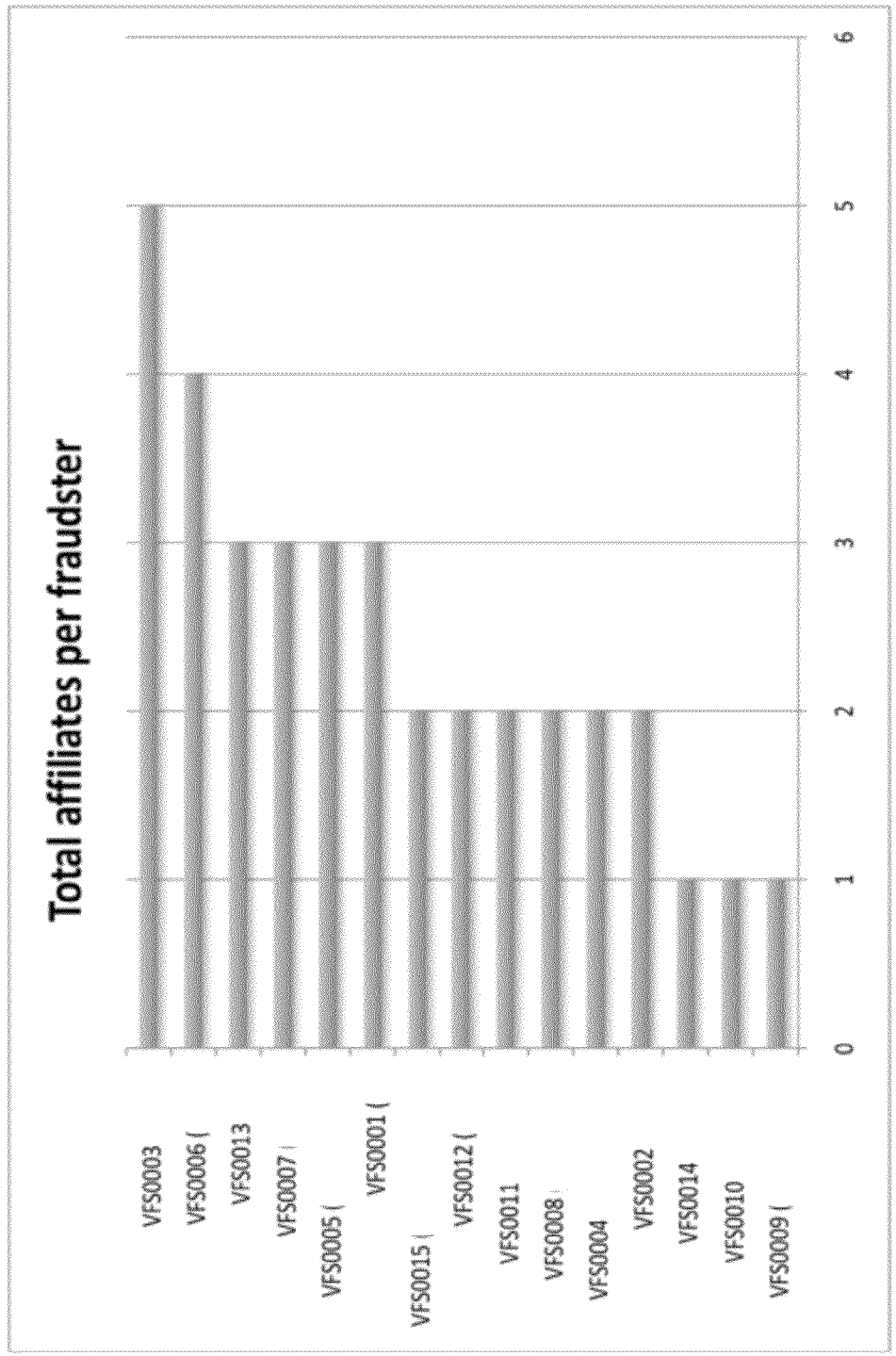
Figure 12:
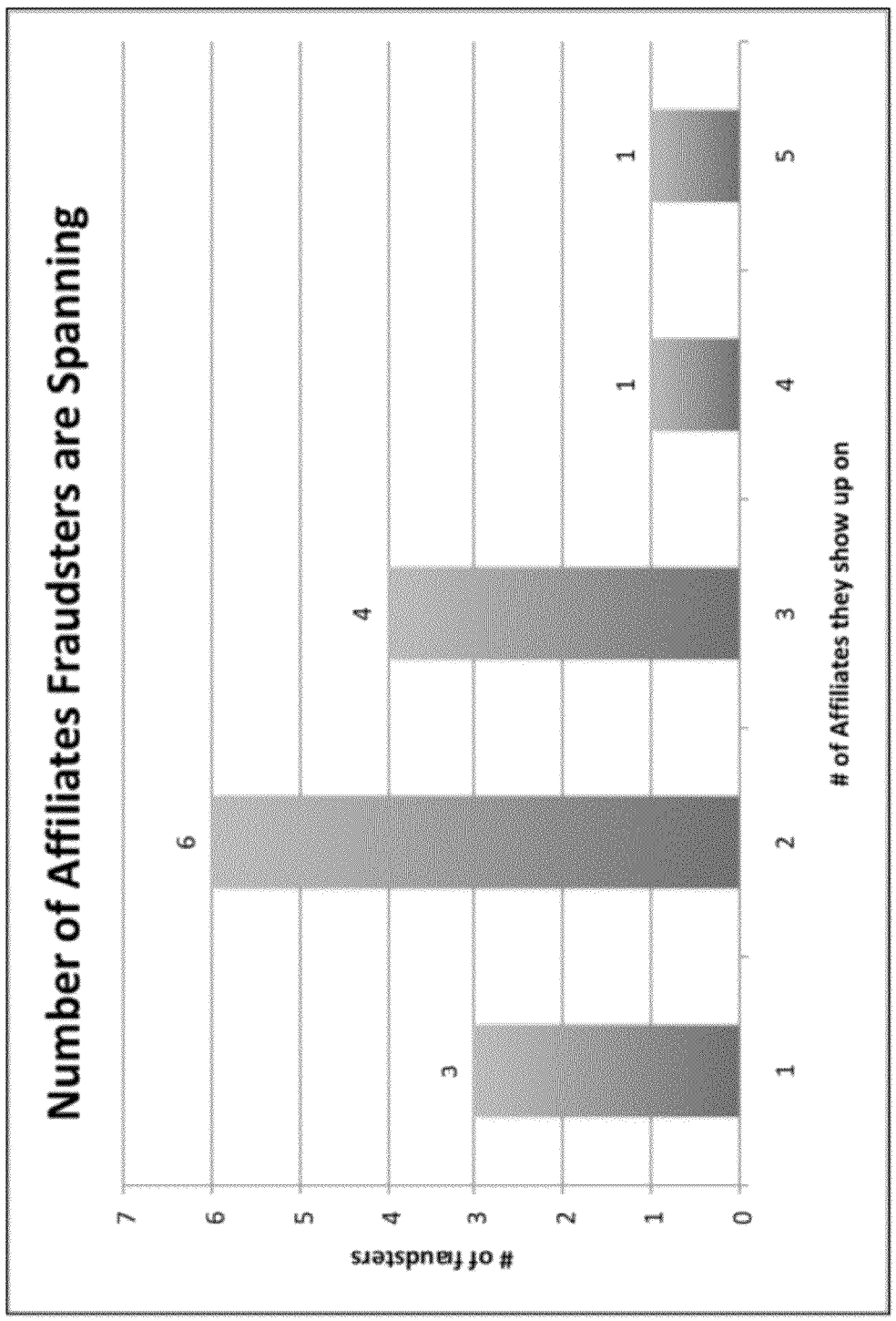

Table 2 illustrates how the fraudsters operated within a period of time. FIG. 10 shows an exemplary graphical view of the same. FIG. 11 and FIG. 12 show a number of affiliate codes that each fraudster made calls under. While there were a few fraudsters who used only one affiliate ID, 12 fraudsters used multiple IDs. One fraudster used four affiliates and another used five affiliates. The "affiliate hoppers" are more likely to be determined as repeat fraudsters.

Referring now to Table 3 which shows that the unique fraudsters operated in rings/associations. The live agent may be able to determine associations among the uniquely identified by forming lists. For example, a first list may include fraudsters that used the same set of affiliate numbers. A second list may include fraudsters that were on the same call (e.g., one posing as an affiliate, the other as a customer). These two lists may be used by the live agent to further categorize the fraudsters and place them into rings of association. Based on this information it may be reasonable to conclude that these rings of association were in fact fraud rings working together to execute one or more types of fraud.

Referring now to Table 4 which shows an exemplary process 1000 for call screening new call data. The call data may comprise recorded conversations provided by the first affiliate to the FDS, to detect fraud in subsequent or "new" calls. After screening the new call data against the database 306, it was found that a) eleven new calls were flagged that had the voice of the fraudsters identified earlier, and b) three new affiliates were identified as being used by fraudster voices enrolled in a blacklist database 306. Also, individuals from rings #1 and #3 were present on new affiliate codes. Once all ring members are known, then the live agent may again listen to the call data of the ring members to understand ways in which the ring members operate in a ring, thereby helping the first affiliate to detect fraud in future. Further, the database 306 may be updated to include more information about the fraudsters. Therefore, it may be understood that the database 306 may be constantly updated to capture latest methods and techniques used by the fraudsters, and therefore may help to curb fraud in future without getting obsolete easily.

According to some embodiments, rather than initially comparing call data to fraud patterns, the present technology may be adapted to screen call data and/or call metadata (e.g. time stamp, caller id, etc.) and group calls together according to similar transaction data such as products identification, product quantities, shipping zip code, and so forth. The present technology may then evaluate the voiceprints for each caller in the group to determine information such as asserted identities, common accents, similar phraseology, or other voice information that would indicate that the caller is a fraudster.

Figure 13:
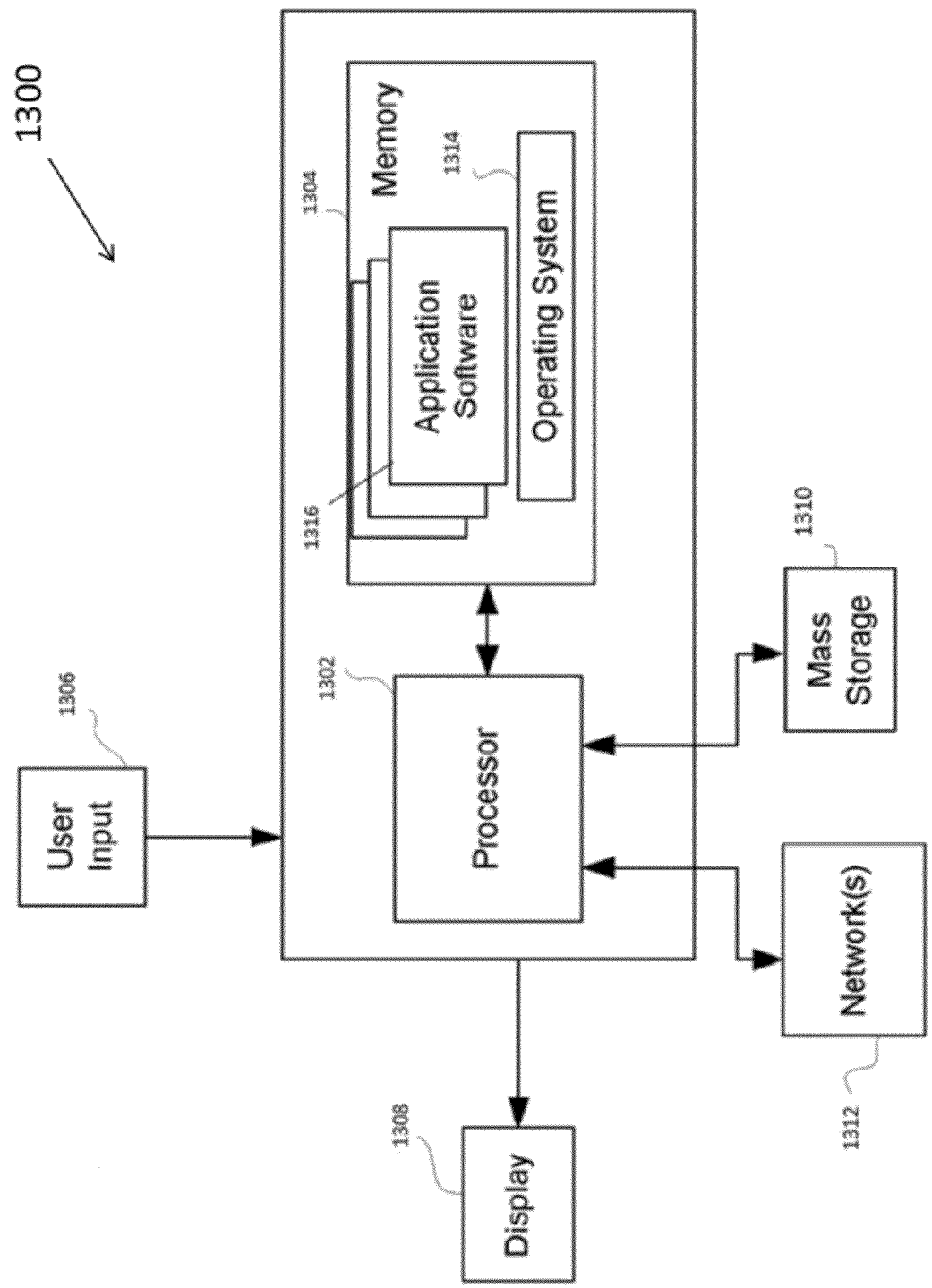
FIG. 13 shows exemplary computing system hardware to implement the exemplary methods and systems disclosed herein.

FIG. 13 of the drawings shows hardware 1300 associated with an exemplary computing system that may be used to implement methods and systems (i.e. the FDS 102) disclosed herein. The hardware 1300 typically includes at least one processor 1302 coupled to a memory 1304. The processor 1302 may represent one or more processors (e.g. microprocessors), and the memory 1304 may represent random access memory (RAM) devices comprising a main storage of the hardware 1300, as well as any supplemental levels of memory, e.g., cache memories, non-volatile or back-up memories (e.g. programmable or flash memories), read-only memories, etc. In addition, the memory 1304 may be considered to include memory storage physically located elsewhere in the hardware 1300, e.g. any cache memory in the processor 1302 as well as any storage capacity used as a virtual memory, e.g., as stored on a mass storage device 1310.

The hardware 1300 also typically receives a number of inputs and outputs for communicating information externally. For an interface with a user or operator, the hardware 1300 may include one or more user input devices 1306 (e.g., a keyboard, a mouse, imaging device, scanner, etc.) and a one or more output devices 1308 (e.g., a Liquid Crystal Display (LCD) panel, a sound playback device (speaker). To embody the present disclosure, the hardware 1300 must include at least one touch screen device (for example, a touch screen), an interactive whiteboard or any other device which allows the user to interact with a computer by touching areas on the screen.

For additional storage, the hardware 1300 may also include one or more mass storage devices 1310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 1300 may include an interface with one or more networks 1312 (e.g., a local area network (LAN), a wide area network (WAN), a wireless network, and/or the Internet among others) to permit the communication of information with other computers coupled to the networks. It should be appreciated that the hardware 1300 typically includes suitable analog and/or digital interfaces between the processor 1302 and each of the components 1304, 1306, 1308, and 1312 as is well known in the art.

The hardware 1300 operates under the control of an operating system 1314, and executes various computer software applications, components, programs, objects, modules, etc. to implement the techniques described above. In particular, the computer software applications will include the client dictionary application, in the case of the client user device. Moreover, various applications, components, programs, objects, etc., collectively indicated by reference 1316 in FIG. 13, may also execute on one or more processors in another computer coupled to the hardware 1300 via a network 1312) e.g., in a distributed computing environment, whereby the processing required to implement the functions of a computer program may be allocated to multiple computers over a network.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the disclosure. Moreover, while the disclosure has been described in the context of fully functioning computers and computer systems, those skilled in the art will appreciate that the various embodiments of the disclosure are capable of being distributed as a program product in a variety of forms, and that the disclosure applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

TABLE 1

Identified fraudsters

| Name | # Calls | Gender | Accent | Persona | Other Names Used |
|---|---|---|---|---|---|
| VFS0001 (Person0) | 48 | M | AccentType1 | Affiliate | |
| VFS0002 (Person1) | 14 | M | AccentType1 | Affiliate | Montav |
| VFS0003 (Person2) | 31 | M | AccentType1 | Affiliate | Igual, Baal |
| VFS0004 (Person3) | 14 | M | AccentType1 | Customer | |
| VFS0005 (Person4) | 9 | F | AccentType1 | Customer | |
| VFS0006 (Person5) | 10 | M | AccentType1 | Affiliate | |
| VFS0007 (Person6) | 7 | M | AccentType1 | Affiliate | |
| VFS0008 (Person7) | 7 | M | AccentType1 | Affiliate | |
| VFS0009 (Person8) | 5 | M | AccentType1 | Affiliate | |
| VFS0010 (Person9) | 8 | M | AccentType1 | Both | |
| VFS0012 (Person10) | 8 | F | Mixed | Both | |
| VFS0013 (Person11) | 29 | M | AccentType1 | Affiliate | |
| VFS0014 (Person12) | 6 | M | AccentType1 | Affiliate | |
| VFS0011 (Person13) | 4 | M | AccentType1 | Affiliate | |
| VFS0015 (Person14) | 8 | M | AccentType1 | Affiliate | |

TABLE 2

Fraud Activity

| Fraudster | StartDate | EndDate | Total affiliates per fraudster |
|---|---|---|---|
| VFS0011 (Person13) | 30-Apr. | 7-Aug. | 2 |
| VFS0013 (Person11) | 3-May | 29-Sep. | 3 |
| VFS0003 (Person2) | 12-May | 1-Oct. | 5 |
| VFS0009 (Person8) | 18-Jun. | 6-Aug. | 1 |
| VFS0006 (Person5) | 1-Jul. | 8-Aug. | 4 |
| VFS0004 (Person3) | 4-Jul. | 19-Jul. | 2 |
| VFS0014 (Person12) | 6-Jul. | 25-Jul. | 1 |
| VFS0002 (Person1) | 24-Jul. | 9-Sep. | 2 |
| VFS0005 (Person4) | 2-Aug. | 25-Sep. | 3 |
| VFS0007 (Person6) | 4-Aug. | 22-Jul. | 3 |
| VFS0012 (Person10) | 9-Aug. | 17-Sep. | 2 |
| VFS0010 (Person9) | 10-Aug. | 14-Sep. | 1 |
| VFS0015 (Person14) | 12-Aug. | 1-Oct. | 2 |
| VFS0008 (Person7) | 18-Aug. | 17-Sep. | 2 |
| VFS0001 (Person0) | 5-Sep. | 7-Oct. | 3 |

TABLE 3

| Fraud Subjects | # Affiliates |
|---|---|
| Ring Of Associations 1 | |
| VFS0005 (Person4) | 3 |
| VFS0002 (Person1) | 2 |
| Ring Of Associations 2 | |
| VFS0006 (Person5) | 4 |
| VFS0007 (Person6) | 3 |
| Ring Of Associations 3 | |
| VFS0003 (Person2) | 5 |
| VFS0001 (Person0) | 3 |
| VFS0013 (Person11) | 3 |
| VFS0012 (Person10) | 2 |
| VFS0011 (Person13) | 2 |
| VFS0008 (Person7) | 2 |
| VFS0015 (Person14) | 2 |
| VFS0010 (Person9) | 1 |
| Solo | |
| VFS0004 (Person3) | 2 |
| VFS0009 (Person8) | 1 |
| VFS0014 (Person12) | 1 |

TABLE 4

| Affiliate ID | Fraud Subject | File Name |
|---|---|---|
| 295421 | VFS0010 (Person9) | 17494_AA336843-DE11CC8D-0C0087AF-28E44829 |
| 294091 | VFS0010 (Person9) | 17197_FED075B2-DE11A091-0C0087AF-28E44829 |
| 291333 | VFS0002 (Person1) | 12232_BCC5F94F-DE11FB76-0C0087AF-28E44829 |
| 291333 | VFS0002 (Person1) | 10693_DC6F20DC-DE110077-0C0087AF-28E44829 |
| 291333 | VFS0002 (Person1) | 10672_AC090BB6-DE11C777-0C0087AF-28E44829 |
| 294091 | VFS0001 (Person0) | 14918_0CA71D12-DE11AF92-0C0087AF-28E44829 |
| 294091 | VFS0001 (Person0) | 17189_E6CE6CAF-DE11D77B-0C0087AF-28E44829 |
| 294091 | VFS0001 (Person0) | 17518_C470DA33-DE111C98-0C0096B0-28E44829 |
| 294091 | VFS0001 (Person0) | 10672_2642F8CB-DE110598-0C0096B0-28E44829 |
| 294091 | VFS0003 (Person2), VFS0012 (Person10) | 12232_A4873717-DE114885-0C0087AF-28E44829 |
| 294091 | VFS0003 (Person2) | 10805_36F0E0C9-DE119A7C-0C0087AF-28E44829 |

What is claimed is:

1. A method for analyzing call data associated with fraudsters, the method comprising:

executing instructions stored in memory, the instruction to be executable by a processor, the instructions being configured to:

responsive to receiving call data associated with fraudsters, compare the call data to a corpus of fraud data to determine one or more unique fraudsters associated with the call data;

associate the call data with one or more unique fraudsters based upon the comparison;

generate one or more voiceprints for each of the one or more identified unique fraudsters from the call data;

store the one or more voiceprints for each of the one or more identified unique fraudsters from the call data in a database;

associate two or more voiceprints together that are determined to belong to the same unique fraudster into a group;

generate a master voiceprint for the group based upon the two or more voiceprints;

generate a fraud behavioral model for one or more voiceprints in a group, the fraud behavioral model including data that identifies behaviors of a unique fraudster; and validate the association of the two or more voiceprints by comparing call data of the two or more voiceprints with the fraud behavioral model.

2. The method according to claim 1, further comprising:
compare the one or more voiceprints to one or more additional voiceprints stored in the database to generate a relative comparison score for the one or more voiceprints relative to each of the one or more additional voiceprints; and group together each of the one or more additional voiceprints having a relative comparison score above a threshold amount.

3. The method according to claim 2, further comprising:
verify the group by manually listening to each voiceprint within the group; and generate a master voiceprint for the group if the group is verified.

4. A method for identifying fraud patterns in call data, the method comprising:
executing instructions stored in memory, the executable instructions to be executed by a processor, for:
analyzing call data associated with fraudsters utilizing voice recognition techniques, the call data being received by a web server associated with one or more entities;
determining keywords included in the call data that are indicative of fraud;
identifying fraud patterns from the keywords;
generating a fraud analytics report based on the fraud patterns, the fraud analytics report comprising a set of visual graphs illustrating the fraud patterns, wherein a visual graph of the set of visual graphs comprises a first axis associated with the unique fraudsters and a second axis associated with a number of calls made; and
storing the fraud patterns in a database communicatively coupled with the web server.

5. The method according to claim 4, wherein keywords may include any of a credit card number, a social security numbers, a bank account number, a telephone number, a name, a location, a username, a password, personally identifiable information, and combinations thereof.

6. The method according to claim 4, wherein the fraud patterns comprise any of a frequency of fraud, a time and a date of fraud, a voice accent, a phone number called from, a phone number called to, a gender, a number of calls made, a number of enterprises being victimized, details of the enterprises being victimized, accomplice details, and combinations thereof.

7. The method according to claim 4, wherein a visual graph of the set of visual graphs comprises a first axis associated with a uniquely identified fraudster and a second axis associated with a number of accounts.

8. The method according to claim 4, wherein a visual graph of the set of visual graphs comprises a first axis associated with a number of unique fraudsters and a second axis associated with a number of accounts.

9. A system for identifying fraud patterns in call data, comprising:
a memory for storing executable instructions; and
a processor for executing the instructions, the executable instructions including:
an analytics engine that analyzes call data associated with fraudsters utilizing voice recognition techniques, the call data being received by a web server associated with one or more entities; and determines keywords included in the call data that are indicative of fraud;
a fraud pattern identifying module that identifies fraud patterns from the keywords and stores the fraud patterns in a database communicatively coupled with the web server; and
a reports generator that generates a fraud analytics report based on the fraud patterns, the fraud analytics report comprising a set of visual graphs illustrating the fraud patterns, wherein a visual graph of the set of visual graphs comprises a first axis associated with a uniquely identified fraudster and a second axis associated with a number of accounts.

10. The system according to claim 9, wherein keywords may any of a credit card number, a social security numbers, a bank account number, a telephone number, a name, a location, a username, a password, personally identifiable information, and combinations thereof.

11. The system according to claim 9, wherein the fraud patterns comprise any of a frequency of fraud, a time and a date of fraud, a voice accent, a phone number called from, a phone number called to, a gender, a number of calls made, a number of enterprises being victimized, details of the enterprises being victimized, accomplice details, and combinations thereof.

12. The system according to claim 9, wherein a visual graph of the set of visual graphs comprises a first axis associated with the unique fraudsters and a second axis associated with a number of calls made.

13. The method according to claim 9, wherein a visual graph of the set of visual graphs comprises a first axis associated with a number of unique fraudsters and a second axis associated with a number of accounts.

14. A non-transitory computer readable storage media having a program embodied thereon, the program being executable by a processor to perform a method for analyzing fraud patterns in call data, the method comprising:
responsive to receiving call data associated with fraudsters, comparing the call data to a corpus of fraud data to determine one or more unique fraudsters associated with the call data;
associating the call data with one or more unique fraudsters based upon the comparison;
generating one or more voiceprints for each of the one or more identified unique fraudsters from the call data;
storing the one or more voiceprints in a database;
comparing the one or more voiceprints to one or more additional voiceprints stored in the database to generate a relative comparison score for the one or more voiceprints relative to each of the one or more additional voiceprints; and grouping together each of the one or more additional voiceprints having a relative comparison score above a threshold amount; and verifying the group by manually listening to each voiceprint within the group and generating a master voiceprint for the group if the group is verified.

* * * * *